Sept. 27, 1966    M. P. FREEMAN ET AL    3,275,411
PLASMA PRODUCTION OF TITANIUM DIOXIDE
Filed April 8, 1963
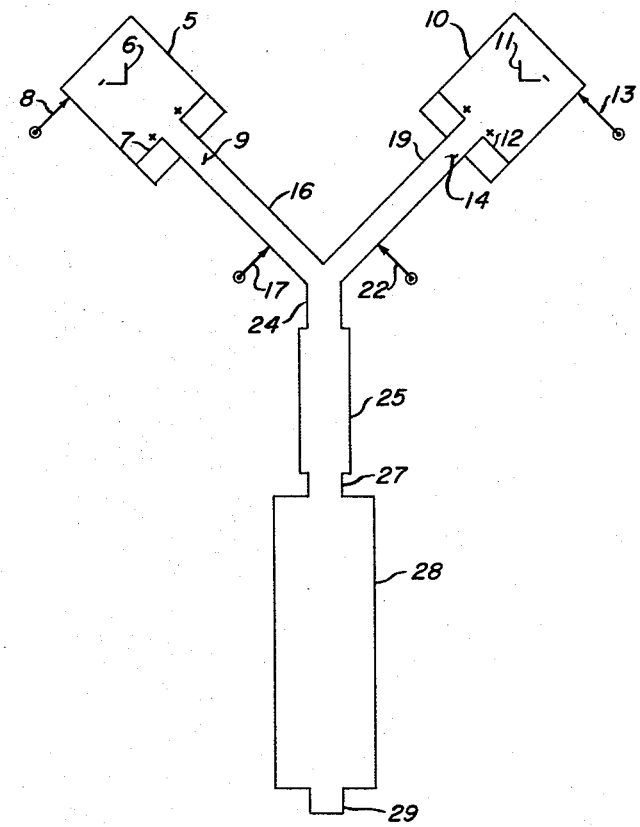
INVENTORS.
MARK P. FREEMAN
FREDRICK FUSSMAN
BY Theodore C. Virgil

United States Patent Office 3,275,411
Patented Sept. 27, 1966

3,275,411
PLASMA PRODUCTION OF TITANIUM DIOXIDE
Mark Phillips Freeman, Darien, Conn., and Frederick Fussman, New York, N.Y., assignors to American Cyanamid Company, Stamford, Conn., a corporation of Maine
Filed Apr. 8, 1963, Ser. No. 271,238
9 Claims. (Cl. 23—202)

This invention relates to an improved process for making titanium dioxide.

Various methods of producing pigmentary titanium dioxide are known at the present time. One method involves the digestion of titaniferous ore material with sulfuric acid to produce titanium sulphate. The titanium sulphate is hydrolyzed to precipitate hydrous $TiO_2$ and further treated to produce pigment grade titanium dioxide by a calcination treatment. By this method, the pigment product has a wide distribution of particle size, consequently, it is necessary to subject the pigment product to further treatment to improve the pigment quality. Another known method of producing pigmentary titanium dioxide is to react titanium tetrachloride with oxygen at an elevated temperature. In this method the reactants are separately preheated to a temperature at which they will react when subsequently combined in a reaction zone. The reaction between titanium tetrachloride and oxygen occurs as a combustion flame and the resultant combustion product contains pigmentary titanium dioxide. Here again the pigment quality, measured by tint tone and particle size, is further improved by means of additional treatments.

One of the major problems involved in the manufacture of $TiO_2$ pigment by the oxidation of $TiCl_4$ is the unwanted deposition of pigment on the surfaces of the processing vessels, necessitating shutdowns in order to remove such deposits. A major difficulty in the operation of the process occurs in the functioning of the burner wherein $TiCl_4$ is oxidized to the pigment material. Various schemes have been suggested for the elimination of the problems in the burner, but for one reason or another the proposed methods are not entirely satisfactory, because while one problem may be overcome in their use, another is created.

Quite unexpectedly, we have discovered that pigmentary grade of titanium dioxide can be advantageously produced from $TiCl_4$ by the utilization of the plasma jet generator. The plasma jet generator is conventional equipment in which an electric arc is employed for heating a gaseous material. The electric arc is stabilized by having the gaseous material to be heated pass through the plasma jet generator continuously. One notable advantage of this method of heating is that the gas stream is heated internally rather than through the walls of a vessel in which it is contained. The nature of the material of the container is less important in our method of heating, because the material is not expected to withstand extremely high temperature which would be needed conventionally by supplying heat through the walls of the container to heat the internal part of a gas stream. The use of the plasma jet generator has made possible heating of the reactant materials to temperatures heretofore considered not practical for commercial purposes.

We have also found, to our surprise, that at the high temperatures to which the heat medium is heated in the plasma jet generator, it becomes unnecessary to use a nucleating agent for the reacting between $TiCl_4$ and oxygen. By the conventional methods of producing pigment from the reaction of $TiCl_4$ and oxygen, usually it is required that a nucleating agent be used. This different between conventional method and that of the present invention represents an important advantage for the present invention. Another advantage is that the use of the plasma jet generator makes it possible to produce a pigment having a large proportion of particles in the optimum size range of about .17 to .22 micron. The pigment was also found to be substantially more spherical in shape than is obtained by any of the other known systems of producing $TiO_2$ pigment. We further found that our novel method of making pigment is substantially more flexible and easily controlled from the standpoint of producing different grades of pigment. Other advantages will become readily apparent from the following description and explanation of the invention.

Accordingly, an object of this invention is to provide a novel method of producing pigment $TiO_2$ by utilizing a plasma generator.

Another object of this invention is to provide a method of producing pigmentary $TiO_2$ having a substantially large proportion of pigment of optimum particle size.

Still another object of the present invention is to produce pigmentary $TiO_2$ without the use of an external nucleating agent.

A further object of this invention is to provide a method of producing a pigmentary $TiO_2$ which is flexible and easily controlled.

Other objects of this invention will become apparent from the following description and explanation thereof.

The present invention is concerned with the preparation of $TiO_2$ pigment by the method which involves preheating an inert fluid to a temperature of about 3000° C. to 12,000° C. or higher. The preheated inert fluid is combined with one of the reactants, namely, $TiCl_4$ and oxygen-containing gas, in order that the temperature of the reactant can be raised to a high level. Thereafter, the other reactant, with or without preheat and/or with or without preheating by means of an additional portion of inert fluid, is combined with the mixture of inert fluid and the other reactant. The total mixture is passed through a reaction zone wherein the temperature of the same is at about 800° C. to 3000° C. The oxygen supplied to the reaction zone either as pure oxygen or in the form of an oxygen-containing gas stream is then reacted with the $TiCl_4$. The residence time of the mixture in the reaction zone is about .001 to 1 second. By an inert fluid, it is intended for the purpose of this invention to mean only fluids which do not react under reaction conditions and have no significant adverse affect on pigment quality or if they react, no significant adverse affect on pigment quality is produced.

In a more particular aspect of the present invention, it is contemplated adding aluminum chloride in a small amount to the reaction zone in order to enhance the yield of rutile pigment.

The inert fluid which is employed as the heating medium in the plasma jet generator may be any gaseous material which is inert in the sense that it will be stable at the elevated temperature to which the material is heated for the purpose of supplying heat to the reaction zone. It should also be inert in the sense of having no effect upon the quality of the pigment which is produced in the reaction zone. Generally, the inert gas may include nitrogen, argon, carbon dioxide, air, etc. It should be understood that when air is used as the inert gas, it is preferably employed only for the purpose of preheating the oxygen needed for the reaction with $TiCl_4$. If it is used to preheat the $TiCl_4$, it should be expected that pigment will be produced immediately. If it is desired to have the pigment produced relatively quicker, then air can be used as the inert gas as a means of supplying heat to $TiCl_4$. On the other hand, if it is desired to premix the $TiCl_4$ and oxygen prior to entry into the reaction zone and such mixing is to be done in the minimum period of time without substantial reaction occurring, then air is not to be used as the inert gas for preheating $TiCl_4$.

For the purpose of the invention the inert gas is heated to a temperature of about 3000° C.–12,000° C. and preferably about 8000 to 10,000° C. The quantity of inert gas employed in the process depends upon the temperature at which pigment is to be produced in the reaction zone and the amount of heat losses suffered in the process. From an engineering standpoint, it is recognized that heat losses becomes greater as the equipment becomes smaller and vice versa. Since it is contemplated using the present process for either laboratory or commercial operations, the quantity of inert gas may comprise about 3 to 95% by volume of the total gases charged to the reaction zone, more usually about 5 to 45% by volume of the total gases charged to the reaction zone. From a commercial point of view, it is preferred that the inert gas comprises about 5 to 10% by volume of the total gases charged to the reaction zone. The quantity of inert gas employed in the process is also dependent upon the temperature to which the inert gas is preheated in the plasma jet generator. As it might be expected the higher the preheat temperature of the inert gas, the lesser the quantity needed to attain the desired reaction temperature.

Nitrogen is preferred as the inert gas in the practice of the present invention. Since it is not necessary to use a nucleating agent in the practice of the present invention for the formation of pigmentary $TiO_2$, it is believed that at the high temperatures to which the inert gas is preheated a change is effected in the nature of the inert gas. While we do not intend to be bound by any theory, it is felt that when heating nitrogen to superelevated temperatures, it becomes substantially atomic nitrogen rather than molecular nitrogen. As the temperature of heating increases, it is also believed that some ionization of nitrogen occurs. The atomic form of nitrogen and the ionic form of nitrogen are believed to serve as nucleating agents in the preparation of the pigmentary $TiO_2$, obviously accounting for the fact that a nucleating agent of the conventional type is not required to obtain pigment by the means of the present invention.

In practicing the invention the inert gas may be preheated as a single stream or as two separate streams. When the inert gas is employed as a single stream, then one of the reactants, namely, $TiCl_4$ and oxygen, is first combined with the preheated inert gas before the second reactant is admixed with the resultant mixture. When the inert gas is used for preheating $TiCl_4$ only to a high temperature, then it is contemplated that the mixture of $TiCl_4$ and inert gas have a tempearture of about 1000° C. to 3000° C. and preferably about 1500° C.–2500° C. The oxygen containing gas, with or without inert gas, is used at a temperature ranging from ambient level to 600° C. In such an operation, the inert gas is first heated without the $TiCl_4$ being present and after attaining the desired preheat temperature, it is combined with $TiCl_4$ to attain the temperature given above. Thereafter, the oxygen containing gas having the temperature specified above is combined with the mixture of inert gas and $TiCl_4$ to produce the reaction mixture which is passed into the reaction zone. Alternatively, the inert gas in a preheated state may be combined with the oxygen containing gas so that the temperature of the mixture is about 2000° C. to 5000° C., more usually about 2000° C. to 4000° C. and preferably about 3000° C. to 4000° C. The other reactant, namely, $TiCl_4$ is used at a temperature of about 140° C. to 600° C. The vaporous $TiCl_4$ is combined with the mixture of inert gas and oxygen containing gas to form the reaction mixture which is charged to the reaction zone.

The preferred method of practicing the present invention is to preheat two separate streams of inert gas and then mixing each inert gas stream with one of the reactants to attain a desired temperature, and subsequently, the inert gas streams containing reactants are combined to form the reaction mixture which is charged to the reaction zone. After the inert gas is combined with the oxygen containing gas, the resultant temperature is about 600° C. to 4000° C. and preferably about 800° C. to 2100° C. The combination of the inert gas and $TiCl_4$ results in a temperature of about 600° C. to 3000° C. and preferably about 800° C. to 2100° C. This method of preheating the reactants is preferred, because it makes possible obtaining the desired preheat temperature in the shortest period of time possible. Further, it facilitates substantially uniform mixing of the inert gas and the reactant without causing an undue deposition of pigment on the surfaces of the container when the two reactants are combined.

In any of the methods described hereinabove for combining the inert gas with the reacted material prior to forming the total reaction mixture, in general, the residence time of the inert gas, measured from the time it leaves the plasma jet generator to the point at which the two reactants are admixed, is about .01 to 1000 milliseconds, more usually about .1 to 100 milliseconds and preferably about 1 to 10 milliseconds. This gives some idea of the short period of time experienced by the inert gas after it leaves the plasma jet generator and enters the reaction zone.

The amount of oxygen containing gas used for the production of pigmentary $TiO_2$ can vary over a considerable range of concentration. From the standpoint of the operability of the process, the present invention could be practiced with as small or large an amount of oxygen as desired without having any appreciable affect on the nature of the $TiO_2$ pigment product. For economical reasons it is preferred to use oxygen containing gas, measured as available oxygen, in an amount at least equal to that required to react with all of the $TiCl_4$ which is charged to the reaction zone and the excess of oxygen above the stoichiometric amount can be as high as 100% by volume. More usually, the process may be practiced using about 15 to 50% by volume of oxygen in excess of the stoichiometric amount, and preferably about 15 to 40% by volume excess of oxygen on the same basis.

We have found that the manner by which the two reactants are combined may have an affect on the period of time that the process will operate before it becomes necessary to shutdown for a cleaning operation. One of the simplest procedures is to have the reaction streams flow from opposite directions and meet in a common mixing zone prior to flowing into the reaction zone in a direction which is perpendicular to the plane in which the two reactant streams meet. This can be referred to as a simple T arrangement.

In the reaction zone the total mixture is at a temperature of about 800° C. to 3000° C. and more usually at a temperature of about 1200 to 2100° C. Reaction temperatures of less than 800° C. can be used if no concern is given to the fact that the reaction rate might be too slow to effect a desirable oxidation of $TiCl_4$ to pigmentary $TiO_2$. Consequently, a temperature of at least 800° C. is employed in order that the reaction rate will be fast enough to obtain substantial conversion of the $TiCl_4$. The reaction mixture remains in the reaction zone for a period of about .001 to 1 second, more usually about .01 to .5 second, and preferably about .05 to .1 second. The residence time of the reaction mixture has a significant effect upon the size of the pigment particles which are produced therein. The pigment particle size has an affect on the tint tone of the pigment. Therefore, by controlling the residence time of the reaction mixture in the reaction zone it is possible to regulate or control pigment quality. This factor indicates an unusual aspect of the present invention.

Aluminum chloride may be added to the reaction zone to enhance the yield of rutile pigment. The amount of aluminum chloride used for this purpose may vary over a wide range, however, in general about 0.1 to 4% by weight, more usually about 1 to 3% by weight, based on the weight of $TiO_2$, measured as aluminum oxide. The aluminum chloride is introduced into the reaction zone directly or it may be introduced as part of the $TiCl_4$ feed material.

To provide a fuller understanding of the present invention, reference will now be made to the accompanying drawing which forms a part of this specification and illustrates, on a laboratory scale, how the present invention is practiced.

In the drawing, a plasma jet generator 5 is of a conventional design and has a negative electrode 6 and an annular positive electrode 7. Nitrogen is fed to the generator 5 by means of a line 8, and it flows longitudinally between the electrodes 6 and 7 to an exit point 9. The flow of nitrogen through the generator stabilizes the arc and becomes heated to the desired preheat temperature. A second plasma jet generator 10 is shown in the drawing, which also contains a negative electrode 11 and an annular positive electrode 12. The nitrogen supplied is fed to the generator 10 by means of line 13 and it passes longitudinally within the generator between the positive and negative electrodes 11 and 12 and thus stabilizes the electric arc. The nitrogen leaves the generator 10 at an exit point 14.

The nitrogen which is discharged from generator 5 flows into a ½″ diameter pipe 16. The pipe 16 is 2″ long. At a point of about 1″ from the discharge point 9 of generator 5, oxygen is fed to the pipe 16 by means of line 17. As to the generator 10, the preheated nitrogen flows into the ½″ pipe 19 and at a distance about 1″ from the discharge point 14, $TiCl_4$ is fed into pipe 19 by means of a line 22. Pipes 16 and 19 form an angle of 90° with respect to each other.

The preheated nitrogen streams flowing in pipes 16 and 19 join in a conduit 24 which serves as a mixing zone. The pipe 24 is 9/16″ long and has a diameter of 11/16″. The pipe 24 forms an angle of 135° with respect to pipe 16, which angle is the same as the angle between pipe 24 and pipe 19. Pipe 24 is connected with a reactor 25. The reactor length and diameter varied in the experiments which are tabulated hereinbelow. The dimensions of the reactor are given in Table II below. The reactor 25 is connected with a pipe 27, which in turn is connected to a water cooled exchanger 28. The water cooled exchanger 28 is a 6″ pipe having a length of 6′. The cooled product leaves the exchanger 28 by means of a pipe 29.

Table I, below, is a tabulation of the flow rates and temperatures employed in the generators 5 and 10 and pipes 16 and 19 for series of runs designated as runs Nos. 1–16 inclusive.

*Table I*

| Run No. | Flow rates (moles/sec.×10³) | | | | Temperatures (° C.) | | | |
|---|---|---|---|---|---|---|---|---|
| | $N_2$ Gen. #5 | $N_2$ Gen. #10 | $O_2$ | $TiCl_4$ | $N_2$ Gen. #5 | Gen. #10 | $N_2$-$O_2$ Mix. | $N_2$-$TiCl_4$ Mix. |
| 1 | 6.25 | 6.25 | 3.4 | 1.8 | 2,700 | 2,700 | 1,150 | 930 |
| 2 | 4.9 | 4.9 | 3.4 | 1.3 | 4,200 | 3,300 | 2,780 | 1,930 |
| 3 | 4.9 | 4.9 | 3.4 | 1.5 | 4,400 | 3,200 | 2,760 | 1,580 |
| 4 | 4.9 | 4.9 | 3.4 | 1.3 | 4,300 | 3,000 | 2,930 | 1,760 |
| 5 | 4.9 | 4.9 | 3.4 | 1.3 | 4,500 | 3,000 | 2,980 | 1,730 |
| 6 | 4.9 | 4.9 | 3.4 | 1.3 | 4,400 | 3,000 | 2,780 | 1,530 |
| 7 | 5.95 | 5.95 | 5.3 | 2.3 | 3,800 | 3,300 | 2,240 | 1,680 |
| 8 | 2.9 | 2.9 | 4.0 | 3.1 | 4,900 | 4,800 | 2,650 | 1,460 |
| 9 | 2.9 | 2.9 | 4.0 | 2.3 | 5,000 | 4,800 | 2,900 | 1,680 |
| 10 | 2.9 | 2.9 | 4.0 | 2.3 | 5,300 | 5,000 | 3,260 | 2,130 |
| 11 | 2.9 | 2.9 | 4.0 | 2.3 | 5,200 | 4,900 | 2,660 | 1,580 |
| 12 | 2.9 | 2.9 | 4.0 | 2.8 | 5,200 | 4,800 | 3,240 | 1,680 |
| 13 | 2.9 | 2.9 | 4.0 | 2.7 | 5,000 | 4,700 | 2,450 | 1,330 |
| 14 | 2.9 | 2.9 | 4.0 | 2.5 | 4,900 | 4,800 | 3,500 | 2,400 |
| 15 | 2.9 | 2.9 | 4.0 | 1.8 | 5,200 | 4,700 | 2,850 | 1,680 |
| 16 | 2.9 | 2.9 | 4.0 | 2.3 | 5,000 | 4,600 | 2,100 | 1,180 |

In Table II below are given the reaction conditions and the pigment quality obtained for the runs 1–16 inclusive which have been described in Table I above.

*Table II*

| Run No. | Reaction | | Reaction Temp., ° C. | Residence Time, Millisec. Reactor | Pigment Rutile Size [1] | Percent $Al_2O_3$ | Percent Rutile | Tint Tone |
|---|---|---|---|---|---|---|---|---|
| | Dia. | Length | | | | | | |
| 1 | 1 | 6 | 1,325 | 36.4 | .20 | 0 | 24 | |
| 2 | 1 | 6 | 1,950 | 32.1 | .17 | 0 | 39 | |
| 3 | 1 | 12 | 1,850 | 63.4 | .15 | 0 | 21 | Blue 3. |
| 4 | | | 1,930 | 2.8 | .13 | 0 | 12 | Blue 5. |
| 5 | 1 | 3 | 1,940 | 17.6 | .15 | 0 | 21 | Blue 4. |
| 6 | 1 | 9 | 1,840 | 48.4 | .16 | 0 | 17 | Blue 3. |
| 7 | 1 | 6 | 1,790 | 25.5 | .16 | 0 | | |
| 8 | 2 | 6 | 1,740 | 148.0 | .21 | 0 | 68 | |
| 9 | 1 | 6 | 1,825 | 40.6 | .18 | 0 | 43 | Blue 3. |
| 10 | 1 | 6 | 1,990 | 37.3 | .17 | 1.6 | 89 | Blue 3. |
| 11 | 1 | 6 | 1,830 | 40.2 | .18 | 1.7 | 92 | Brown 1. |
| 12 | 2 | 3 | 1,860 | 73.2 | .20 | 0.8 | 71 | |
| 13 | 2 | 3 | 1,750 | 77.8 | .23 | 0.8 | 75 | |
| 14 | 2 | 3 | 2,070 | 68.2 | .21 | 0.8 | 72 | |
| 15 | 1 | 6 | 1,890 | 40.8 | .18 | 0.7 | 72 | Blue 1. |
| 16 | 1 | 6 | 1,700 | 43.3 | .18 | 2.0 | 98 | Blue 2. |

[1] Average.

It can be seen from Table II above that the particle size of the pigment is exceptionally good and this is indicated in the tint tone of the pigment as well. It should also be noted that the percent rutile present in the pigment increased substantially with the use of aluminum chloride. As a matter of fact, it is possible to obtain 98% rutile by using 2% by weight of aluminum chloride, measured as aluminum oxide.

We claim:

1. A process which comprises heating an inert fluid in a flow-stabilized arc to a temperature of about 3,000° C. to 12,000° C. to form a plasma stream, combining therewith at least one of the reactants $TiCl_4$ and an oxygen-containing gas, mixing the reactants to form a heated reaction mixture of plasma, $TiCl_4$ and the oxygen-containing gas, passing the resultant reaction mixture into a reaction zone wherein the temperature is between about 800° C. and 3,000° C., maintaining the reaction mixture in said zone for a period of about 0.001 to one second to thereby produce particulate titanium dioxide in which the particles are spheroidal and in which a large proportion of the particles have an average particle size diameter of at least 0.13 micron.

2. The process of claim 1 wherein a large proportion of the titanium dioxide particles have an average particle size diameter in the range of about 0.13 to about 0.23.

3. A process which comprises heating separately two streams of inert fluid in a flow-stabilized arc to temperatures in the range of about 3,000° C. to 12,000° C. to form separate plasma streams, mixing $TiCl_4$ with one of said plasma streams, mixing an oxygen-containing gas with the other of said plasma streams, combining the resulting mixtures to form a hot $TiCl_4$-oxygen reaction mixture, passing said reaction mixture through a reaction zone wherein the temperature is about 800° C. to about 3,000° C., and maintaining the mixture in said zone for a period of about 0.001 to one second to thereby produce particulate titanium dioxide wherein the particles are substantially spheroidal and wherein said particles have an average particle size diameter of at least 0.13 micron.

4. The process of claim 3 wherein the average is about 0.13 to about 0.23 micron.

5. The process of claim 3 wherein the inert fluid is nitrogen.

6. The process of claim 3 characterized by the presence in the reaction mixture of a small amount of aluminum chloride.

7. The process of claim 3 wherein oxygen is present in said reaction mixture in an amount equal to about 15 to about 50% above the stoichiometric quantity needed to react with all the $TiCl_4$.

8. A process which comprises heating separately two streams of nitrogen in a flow-stabilized arc to temperatures in the range of about 8,000° C. to 10,000° C. to form separate plasma streams, mixing $TiCl_4$ with one of said plasma streams and mixing oxygen with the other of said plasma streams, combining the resulting two plasma streams to form a reaction mixture containing $TiCl_4$ and oxygen, passing the reaction mixture through a reaction zone for a period of 0.05 to 0.1 second, the temperature in the reaction zone being about 1,200° C. to 2,100° C. and thereby producing particulate titanium dioxide wherein the particles are spheroidal and wherein a large proportion of the particles have an average particle size diameter in the range of about 0.13 to about 0.23 micron.

9. The process of claim 8 characterized by the presence in the reaction mixture of a small amount of aluminum chloride.

References Cited by the Examiner

UNITED STATES PATENTS

| | | | |
|---|---|---|---|
| 2,979,449 | 4/1961 | Sheer et al. | 204—164 |
| 3,096,281 | 12/1962 | Wilson. | |
| 3,114,691 | 12/1963 | Case | 204—328 X |

OSCAR R. VERTIZ, *Primary Examiner.*

MAURICE A. BRINDISI, BENJAMIN HENKIN,
*Examiners.*

E. STERN, *Assistant Examiner.*